US007647420B2

(12) United States Patent
Satoh et al.

(10) Patent No.: US 7,647,420 B2
(45) Date of Patent: Jan. 12, 2010

(54) APPARATUS AND METHOD FOR CONTROLLING STORAGE DEVICE

(75) Inventors: Masakazu Satoh, Tokyo (JP); Kazunari Suzuki, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 11/366,933

(22) Filed: Mar. 2, 2006

(65) Prior Publication Data

US 2006/0212603 A1 Sep. 21, 2006

(30) Foreign Application Priority Data

Mar. 17, 2005 (JP) ............................. 2005-077401

(51) Int. Cl.
*G06F 15/16* (2006.01)
*G06F 11/00* (2006.01)
*H03M 13/00* (2006.01)

(52) U.S. Cl. ................. 709/232; 709/233; 709/206; 709/250; 714/752; 370/225; 370/235; 370/252

(58) Field of Classification Search ......... 709/230–237, 709/223–226, 250, 253, 206; 370/468, 477, 370/225, 230–237, 252–254; 714/752
See application file for complete search history.

(56) References Cited

U.S. PATENT DOCUMENTS 6,192,422 B1 * 2/2001 Daines et al. ............... 710/29
6,501,732 B1 * 12/2002 Xu et al. ..................... 370/235
6,529,957 B1 * 3/2003 Joergensen ................. 709/233
2002/0049746 A1 * 4/2002 De Roose ....................... 707/1
2003/0067942 A1 * 4/2003 Altenbernd et al. ......... 370/468
2006/0195891 A1 * 8/2006 Freyman et al. ................ 726/4

FOREIGN PATENT DOCUMENTS

| JP | PUPA2000-022678 | 1/2000 |
| JP | PUPA2002-152184 | 5/2002 |
| JP | 2004-48124 | 2/2004 |

* cited by examiner

*Primary Examiner*—Wing F Chan
*Assistant Examiner*—Benjamin M. Thieu
(74) *Attorney, Agent, or Firm*—Ronald Kaschak; Shimokaji & Associates, P.C.

(57) ABSTRACT

A method and apparatus for controlling a transmission of data from a first storage device to a second storage device. The first storage device includes a recording unit for recording the data, a buffer for temporarily storing the data read from the recording unit, and a transmission unit for transmitting the data read from the buffer. It is determined that sufficient buffer space in the buffer is not available for the transmission of the data in a predetermined time interval. It is ascertained whether a transmission error exists in a communication line connecting the first storage device to the second storage device. If the transmission error exits, then the transmission unit is controlled to not perform the transmission of the data from the first storage device; otherwise the transmission unit is not controlled to not perform the transmission of the data from the first storage device.

1 Claim, 7 Drawing Sheets

APPARATUS AND METHOD FOR CONTROLLING STORAGE DEVICE

BACKGROUND OF THE INVENTION

1. Technical Field

The present invention relates generally to an apparatus, method and computer program for controlling a storage device, and more particularly to a control apparatus, the storage device, a control method, and a computer program for controlling data transmission and reception performed by the storage device with an external apparatus.

2. Related Art

In recent years, a system for implementing disaster countermeasures has been put in practical use by connecting server devices or disk units via wide area networks using fiber channels to perform remote backup of data. In this system, high reliability is required for a communication line employed for the wide area network. For this reason, in many cases, both of a communication line for general use and a communication line for backup are prepared in advance. As a result of this, even if an error should occur in one communication line, the communication would be able to be continued with the other communication line.

In order to reduce maintenance costs or the like, the communication line for backup has a bandwidth smaller than that of the communication line for general use in many cases. For this reason, the bandwidth of the communication is different between the cases of using the communication line for general use and using the communication line for backup.

Specifically, data to be transmitted from a storage device to the outside are once stored in a buffer provided in a host bus adapter, and are read from the buffer at timings according to the bandwidth of the communication line and transmitted therefrom. A control apparatus for communication control provided in the storage device periodically detects whether or not the buffer space is available, and if the buffer is available, the control apparatus reads data out of a recording unit (for example, archive media such as a magnetic disk) to store the data in the buffer. By preparing such buffers, even where the bandwidth of an external communication line varies to some extent, the data can be transmitted continuously.

As a reference technique, there has conventionally been proposed a technique in which, regarding a storage device connected to the network, an upper limit of the communication bandwidth for the storage device to communicate with another apparatus is calculated based on a limit on the performance of the storage device (for example, data such as an access speed of a disk or the like), and bandwidth guarantee in the network is provided on the basis of the upper limit (see Japanese Unexamined Patent Publication (Kokai) No. 2004-48124).

SUMMARY OF THE INVENTION

The present invention provides a method for controlling a transmission of data from a first storage device to a second storage device, said first storage device including a recording unit for recording said data, a buffer for temporarily storing said data read from the recording unit, and a transmission unit for transmitting said data read from the buffer, said method comprising:

determining that sufficient buffer space in the buffer is not available for said transmission of said data in a predetermined time interval;

responsive to said detecting that said buffer space is not available, ascertaining whether a transmission error exists in a communication line connecting the first storage device to the second storage device;

if said ascertaining ascertains that said transmission error exists, then controlling the transmission unit to not perform said transmission of said data from the first storage device;

if said ascertaining ascertains that said transmission error does not exist, then not controlling the transmission unit to not perform said transmission of said data from the first storage device.

The present invention provides a computer program product, comprising a computer-readable recording medium in which a computer readable program is stored, said program being adapted to be executed on a computer to perform a method for controlling a transmission of data from a first storage device to a second storage device, said first storage device including a recording unit for recording said data, a buffer for temporarily storing said data read from the recording unit, and a transmission unit for transmitting said data read from the buffer, said method comprising:

determining that sufficient buffer space in the buffer is not available for said transmission of said data in a predetermined time interval;

responsive to said detecting that said buffer space is not available, ascertaining whether a transmission error exists in a communication line connecting the first storage device to the second storage device;

if said ascertaining ascertains that said transmission error exists, then controlling the transmission unit to not perform said transmission of said data from the first storage device;

if said ascertaining ascertains that said transmission error does not exist, then not controlling the transmission unit to not perform said transmission of said data from the first storage device.

The present invention provides an apparatus comprising a computer for executing a computer readable program to perform a method for controlling a transmission of data from a first storage device to a second storage device, said first storage device including a recording unit for recording said data, a buffer for temporarily storing said data read from the recording unit, and a transmission unit for transmitting said data read from the buffer, said method comprising:

determining that sufficient buffer space in the buffer is not available for said transmission of said data in a predetermined time interval;

responsive to said detecting that said buffer space is not available, ascertaining whether a transmission error exists in a communication line connecting the first storage device to the second storage device;

if said ascertaining ascertains that said transmission error exists, then controlling the transmission unit to not perform said transmission of said data from the first storage device;

if said ascertaining ascertains that said transmission error does not exist, then not controlling the transmission unit to not perform said transmission of said data from the first storage device.

DETAILED DESCRIPTION OF THE INVENTION

Although the present invention will be described with reference to embodiments according to the present invention, it should be understood that the embodiments described below do not limit the scope of the invention and all the combinations of features described in the embodiments are not necessarily essential for the invention to solve the problems.

If the bandwidth of the communication line varies exceeding a certain range, the communication will be interrupted or an adequate communication bandwidth may not be provided. For example, if the bandwidth becomes extremely small, the control apparatus tries to detect whether the buffer is available before the data are transmitted from the buffer, and therefore whether the buffer is available cannot be detected. In this case of the buffer not being available, the communication is stopped because it is determined that a disconnection and/or an error have occurred in the communication line.

If the communication bandwidth becomes extremely large, the buffer becomes empty before the control apparatus detects that the buffer is available, data to be transmitted cannot be prepared, by which the communication bandwidth cannot be secured. In this manner, internal processing of the storage device is affected by the variation of the external communication line, and thereby the communication cannot be performed smoothly in some cases.

The present invention provides an apparatus for controlling data transmission and reception in a storage device including a recording unit for recording data, a buffer for temporarily storing the data read from the recording unit, and a transmission unit for transmitting the data read from the buffer, the apparatus comprising: a buffer detector for detecting if the buffer space is available for data transmission at a predetermined time interval that is specified; a determining unit for determining if a transmission error occurs in a communication line connected to the storage device in response to detection that the buffer space is not available; a bandwidth detector for detecting a bandwidth of the communication line; an interval setting unit for setting the time interval to a greater value if the detected bandwidth is smaller than a threshold value. According to other aspects of the present invention, there are provided a method for controlling the storage device by the control apparatus and a program for controlling the storage device.

According to the present invention, even where the bandwidth of the external communication line is varied more largely than before, the communication can be appropriately continued.

Figure 1:
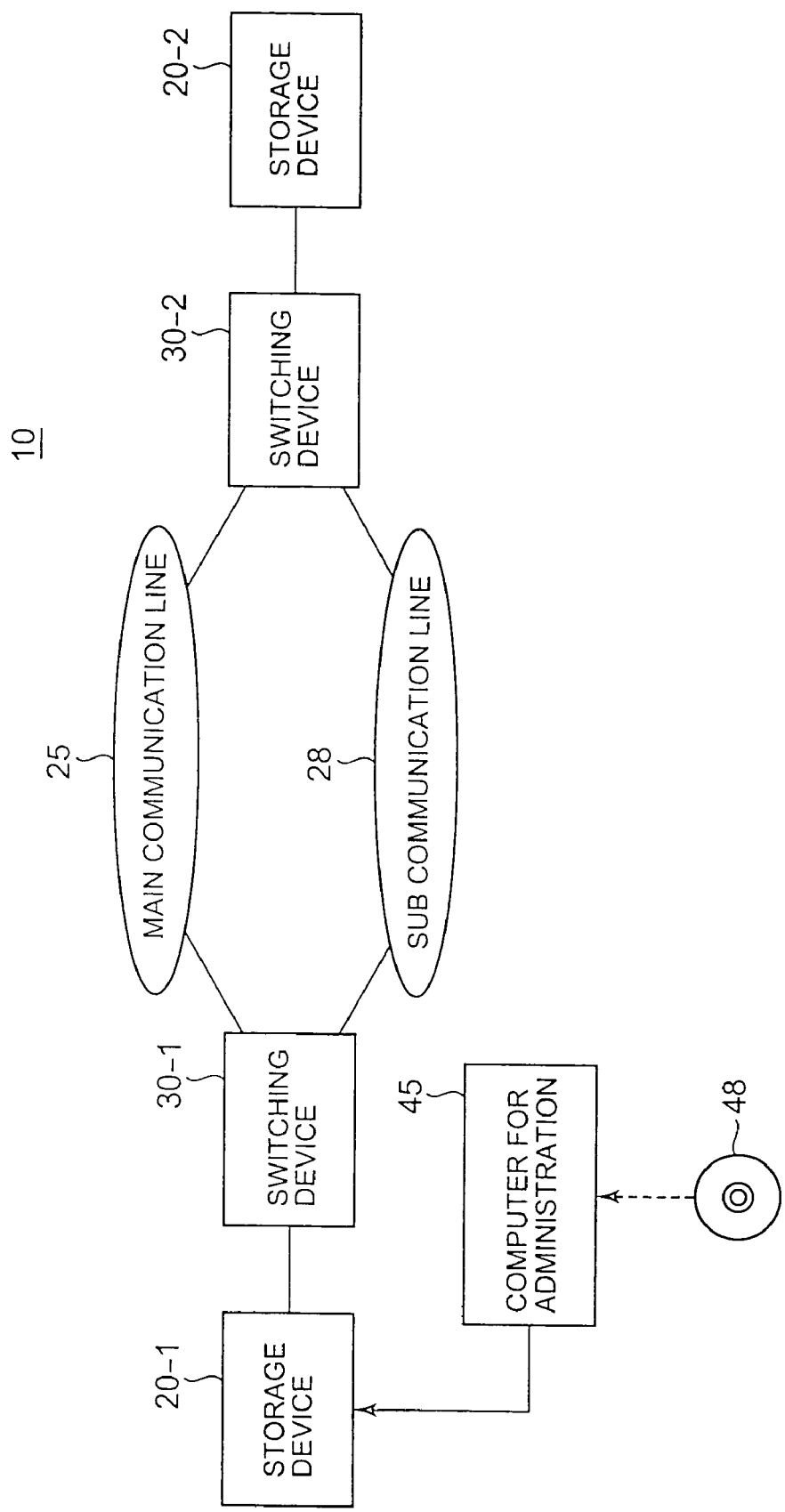
FIG. 1 depicts a communication network that comprises a storage device, in accordance with embodiments of the present invention.

FIG. 1 depicts a communication network 10, in accordance with embodiments of the present invention. The communication network 10 includes a storage device 20-1, a storage device 20-2, a switching device 30-1, a switching device 30-2, and a computer for administration 45. The storage device 20-1 is connected to the switching device 30-1 via a communication line in conformity with the fiber channel standard or the like. The storage device 20-1 then transmits data recorded therein to the storage device 20-2 sequentially passing through the switching device 30-1, a main communication line 25, and the switching device 30-2, and records the data in the storage device 20-2. Hence, backup of the data recorded in the storage device 20-1 is written in the storage device 20-2, which is remotely provided from the storage device 20-1.

The computer for administration 45 reads a computer-readable program, for controlling the storage device 20-1, out of a computer program product comprising a recording medium such as a CD-ROM 48 or the like to record the program in the storage device 20-1, and causes the storage device 20-1 to execute the program on the computer for administration 45.

If a communication error or the like occurs in the main communication line 25, the switching device 30-1 transmits the data to the switching device 30-2 via a sub communication line 28 instead of the main communication line 25. As a result of this, even where the error occurs in the main communication line 25, the storage device 20-1 can continue the communication with the storage device 20-2. However, since the sub communication line 28 is used only when the communication error occurs in the main communication line 25, the sub communication line 28 may have a bandwidth smaller than that of the main communication line 25 in order to reduce the maintenance costs or the like. The storage device 20-1 in this embodiment is intended to continue an appropriate communication by making it hard for an overflow or an underflow to occur in the transmission buffer provided in the storage device 20-1, even in the foregoing condition.

Figure 2:
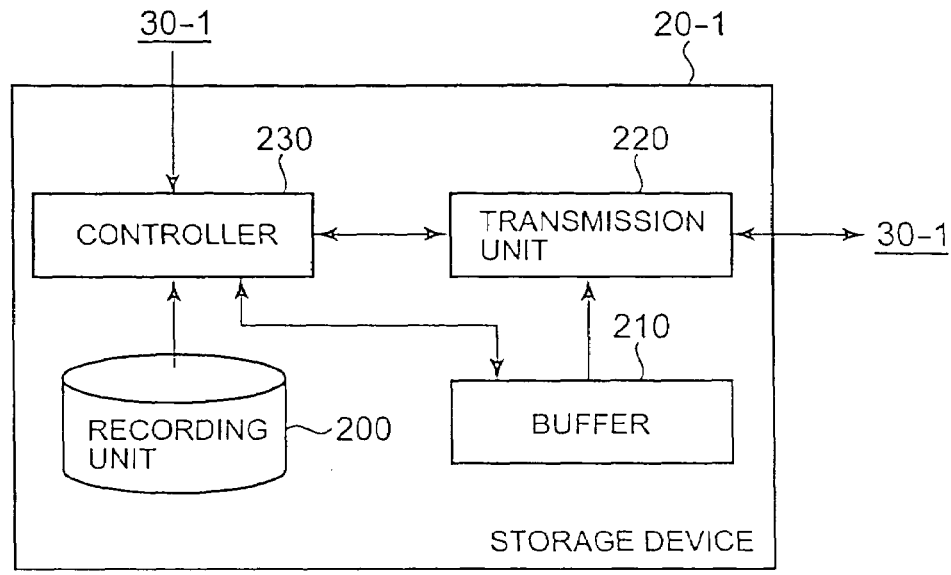
FIG. 2 depicts the storage device of FIG. 1 in detail, said storage device comprising a controller, in accordance with embodiments of the present invention.

FIG. 2 depicts the storage device 20-1 of FIG. 1 in more detail, in accordance with embodiments of the present invention. The storage device 20-1, which is a storage device conforming to, for example, the fiber channel standard, includes a recording unit 200, a buffer 210, a transmission unit 220, and a control apparatus 230. The recording unit 200 records data. The buffer 210 temporarily stores data read from the recording unit 200.

The transmission unit 220 transmits the data read from the buffer 210 to the external switching device 30-1 or the like. More specifically, in order to prevent congestion in the switching device 30-1, the transmission unit 220 transmits the data read from the recording unit 200 to the switching device 30-1 in response to a reception of a control signal indicating that data transmission is permitted from the switching device 30-1. The control signal indicates that an entry becomes available in the output buffer for storing the data to be transmitted from the switching device 30-1 to another apparatus. For example, it is an R_RDY signal in the fiber channel standard.

The control apparatus 230 is an HBA (Host Bus Adapter) conforming to, for example, the fiber channel standard, and performs various kinds of control in the processing for the storage device 20-1 to communicate with the external apparatus. For example, the control apparatus 230 detects whether the buffer 210 space is available. If the buffer 210 is available, the control apparatus 230 reads the data to be transmitted out of the recording unit 200 and then stores the data into the buffer 210. In addition, the control apparatus 230 controls the transmission unit 220 to not perform a transmission if an error occurs.

Figure 3:
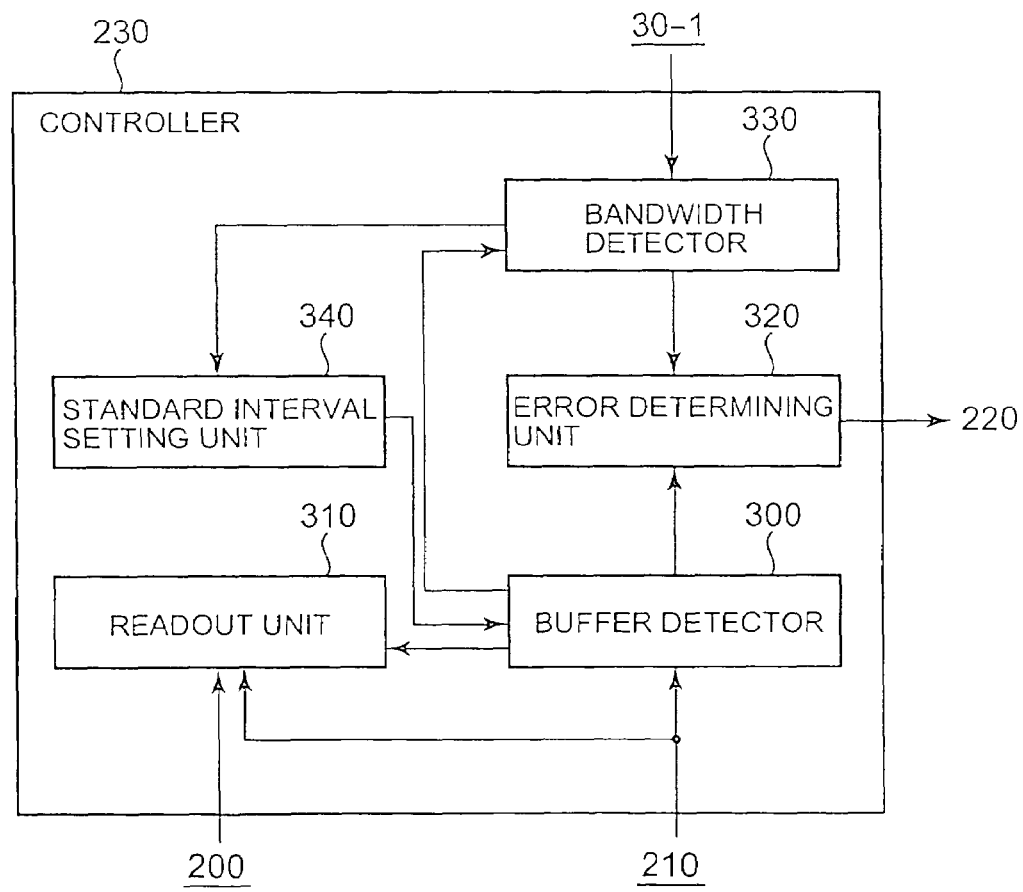
FIG. 3 depicts the controller of FIG. 2 in detail, in accordance with embodiments of the present invention.

FIG. 3 depicts the controller 230 of FIG. 2 in more detail, in accordance with embodiments of the present invention. The controller 230 includes a buffer detector 300, a readout unit 310, an error determining unit 320, a bandwidth detector 330, and a standard interval setting unit 340. The buffer detector 300 detects whether the buffer 210 space is available at every predetermined standard time interval. The readout unit 310 reads the data to be transmitted out of the recording unit 200 in order to store the data in the buffer 210 on condition that the buffer detector 300 detects that the buffer 210 is available. The error determining unit 320 determines that the error has occurred in the external communication line such as, for example, the main communication line 25, connected to the storage device 20-1 on condition that the buffer detector 300 detects that the buffer 210 is not available. The error determining unit 320 then controls the transmission unit 220 to abort the transmission in response to the determination that the error has occurred.

The bandwidth detector 330 detects the bandwidth of an external communication line connected to the storage device 20-1. For example, the bandwidth detector 330 detects the bandwidth of the communication line based on the control signal received from the switching device 30-1 connected via the communication line. The communication line to be a target of the detection may be a wide area communication line, such as the main communication line 25 or the sub communication line 28, may be a communication line between the storage device 20-1 and the switching device 30-1, or may be an entire communication line if the control signal passes through the above communication lines sequentially. In addition, the control signal is only required to include information for specifying the bandwidth. For example, the bandwidth detector 330 may detect the bandwidth of the communication line based on the control signal, which is received from the switching device 30-1 and indicates that the switching device 30-1 has changed the communication path for transmitting the data to another apparatus. Specifically, this control signal may be for use in selecting the communication path conforming to an OSPF (Open Shortest Path First) protocol.

The standard interval setting unit 340 sets the standard time interval, which is a time interval at which the buffer detector 300 detects a status of whether the buffer 210 space is based on the bandwidth detected by the bandwidth detector 330. Specifically, if the bandwidth detected by the bandwidth detector 330 is smaller than a threshold value, the standard interval setting unit 340 sets the standard time interval longer as compared with a case where the bandwidth is larger than the threshold value. Thereby, that makes it possible to prevent stopping the communication accidentally when there is no error and to effectively utilize a communication band of the communication line.

Figure 4:
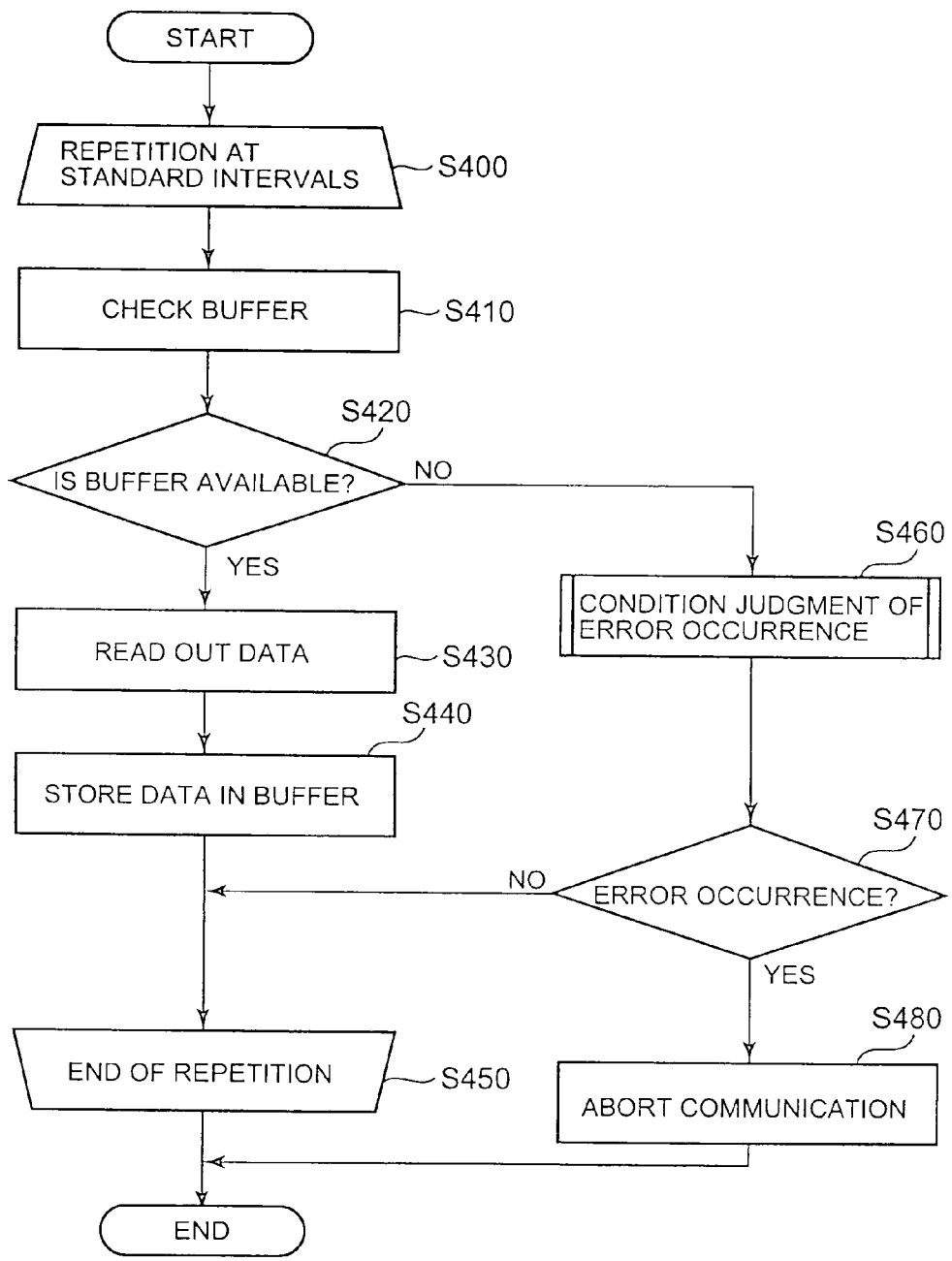
FIG. 4 is a flowchart of processing for the storage device of FIG. 2 to transmit data, said flowchart including an error condition determining step, in accordance with first embodiments of the present invention.

FIG. 4 is a flowchart of processing for the storage device 20-1 of FIG. 2 to transmit data, in accordance with first embodiments of the present invention. The storage device 20-1 performs the following processes at every standard time interval (i.e., at each iteration of the loop comprising steps S410-S450) set by the standard interval setting unit 340 (S400). The buffer detector 300 detects whether the buffer 210 space is (S410). The readout unit 310 reads the data to be transmitted out of the recording unit 200 (S430) to store the data in the buffer 210 (S440) in response to detecting that the buffer 210 is available (S420: YES). The storage device 20-1 then returns the flow to the step S410 (S450).

In response to not detecting the status where the buffer 210 is available S420: NO), the error determining unit 320 determines conditions for indicating that an error has occurred in the external communication line connected to the storage device 20-1 (S460). If an error occurs in the communication line, (S470: YES), the error determining unit 320 causes the transmission unit 220 to abort the transmission (S480). If an error does not occur in the communication line (S470: NO), the flow is returned to the step S410 (S450).

Figure 5:
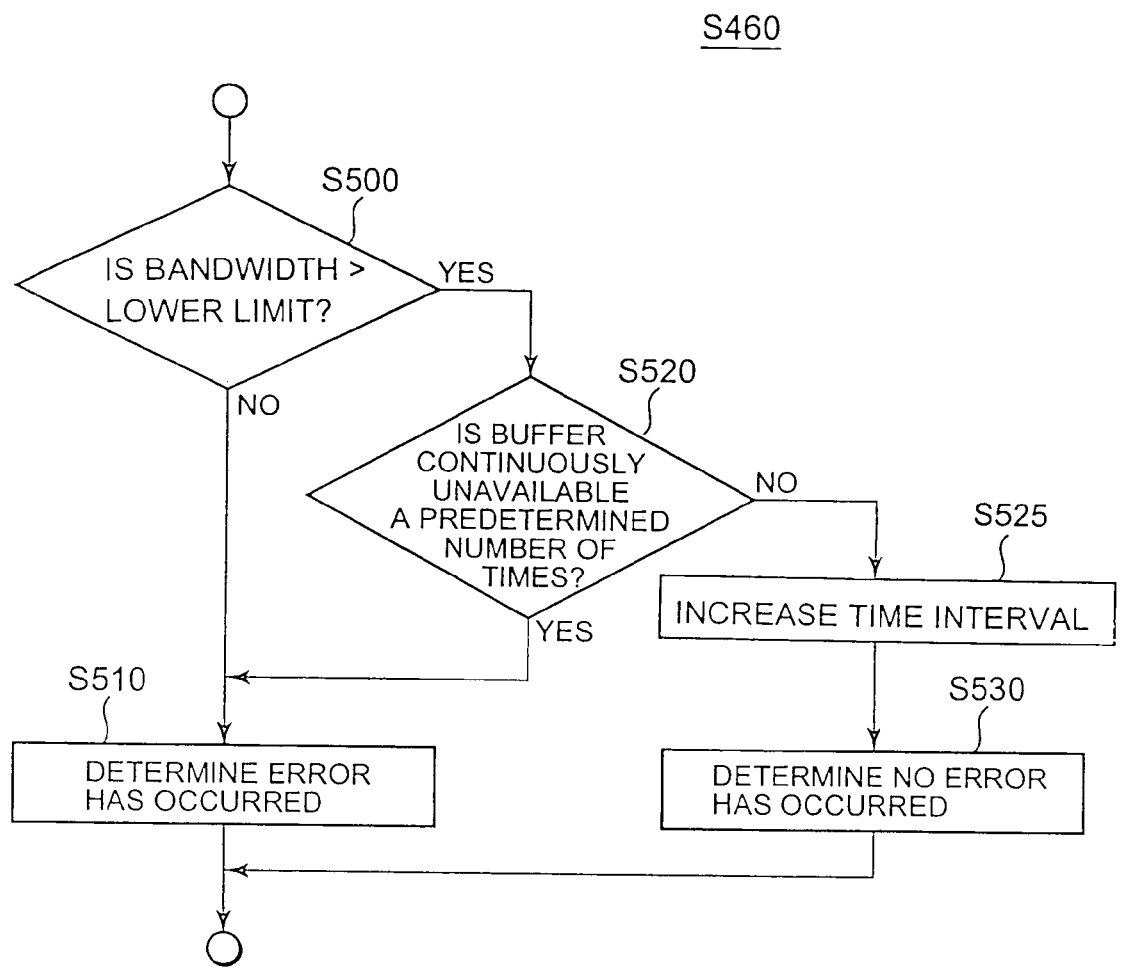
FIG. 5 is a flow chart for the error condition determining step of FIG. 4.

FIG. 5 shows details of the process at S460 in FIG. 4. The error determining unit 320 determines whether the bandwidth detected by the bandwidth detector 330 is equal to or lower than a predetermined threshold (i.e., lower limit) value that is specified (S500). If the bandwidth is larger than the lower limit (S500: NO), the error determining unit 320 determines that the error has occurred in the external communication line (S510). If the bandwidth is equal to or lower than the lower limit (S500: YES), the error determining unit 320 determines whether the buffer detector 300 continuously detects the status where the buffer 210 is not available a predetermined number of times (S520) that is specified (i.e., the buffer 210 is not available in step S420 of FIG. 4 a specified number of successive iterations of the loop through steps S410-S450).

If the error determining unit 320 continuously detects the status where the buffer 210 is not available a specified number of times (S520: YES), the error determining unit 320 determines that the error has occurred in the external communication line (S510). Meanwhile, if the number of times the unavailable status of the buffer 210 is detected continuously is less than the specified number of times (S520: NO), then the time interval may be increased to a greater value (S525). The error determining unit 320 determines that the error has not occurred in the external communication line (S530). As will be understood, in a state where the bandwidth becomes extremely small (as determined in step S500) and the time interval for detecting the status where the buffer 210 is available reaches an upper limit, the error determining unit 320 does not determine that the error has occurred unless the unavailable status of the buffer 210 is detected continuously a predetermined number of times that is specified (in step S520). That makes it possible to further increase accuracy for the error determination.

Figure 6:
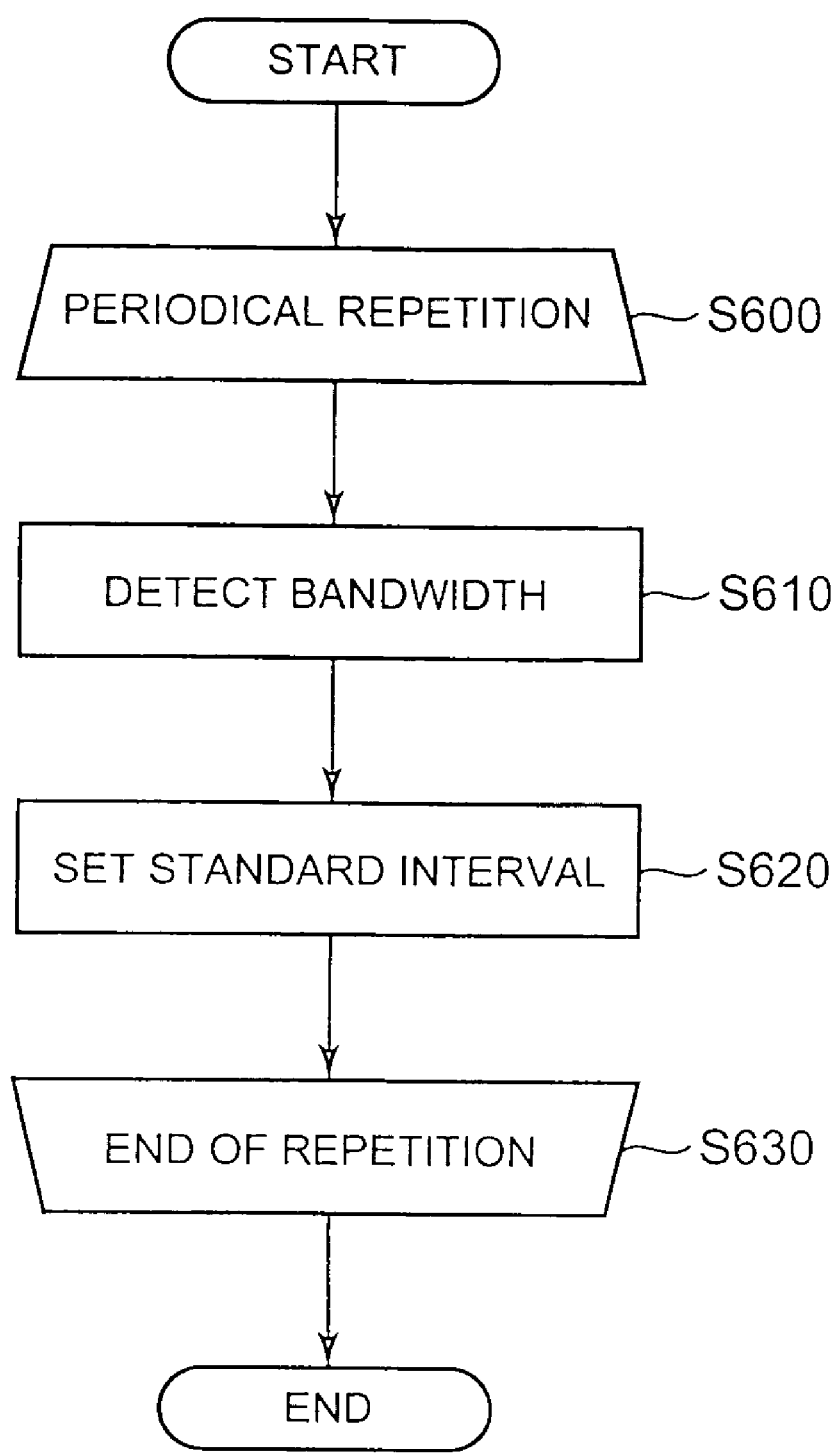
FIG. 6 is a flowchart of processing for the controller of FIG. 3 to set a standard time interval, in accordance with embodiments of the present invention.

FIG. 6 shows a flowchart of the processing for the control apparatus 230 to set a standard time interval, in accordance with embodiments of the present invention. The storage device 20-1 repeats the following processes periodically, for example (S600). The bandwidth detector 330 detects the bandwidth of the external communication line connected to the storage device 20-1 (S610). The bandwidth detector 330 may detect the bandwidth of the communication line based on, for example, the frequency for the transmission unit 220 to receive the R_RDY signal from the switching device 30-1. Since the frequency of receiving the R_RDY signal depends upon the bandwidth for the switching device 30-1 to communicate with the switching device 30-2, a predicted value of the bandwidth may be calculated based on the frequency with a certain amount of accuracy.

On condition that a ratio of free capacity (i.e., unused capacity) to the maximum capacity of the output buffer provided in the switching device 30-1 is less than a predetermined reference ratio that is specified, the bandwidth detector 330 may detect the bandwidth of the communication line based on the frequency of receiving the R_RDY signal. It is because, if such condition is satisfied, variation of the bandwidth is not easily absorbed by the output buffer and therefore the bandwidth of the main communication line 25 or the like is easily reflected in the transmission frequency of the R_RDY signal. Specifically, the bandwidth detector 330 may detect whether or not such condition is satisfied based on reception patterns for receiving the R_RDY signal.

Alternatively, on condition that the ratio of free capacity to the maximum capacity of the buffer 210 within the time period is less than a specified reference ratio, the bandwidth detector 330 may detect a transfer speed of the data that the transmission unit 220 transfers within a predetermined time period, as a bandwidth. It is because, in such a case, the bandwidth allowing communication through the external communication line is easily reflected in the transmission speed of the storage device 20-1.

The standard interval setting unit 340 then sets the standard time interval which is a time interval at which the buffer detector 300 detects the status where the buffer 210 is available (S620). The storage device 20-1 repeats the processes described hereinabove (S630).

Figure 7:
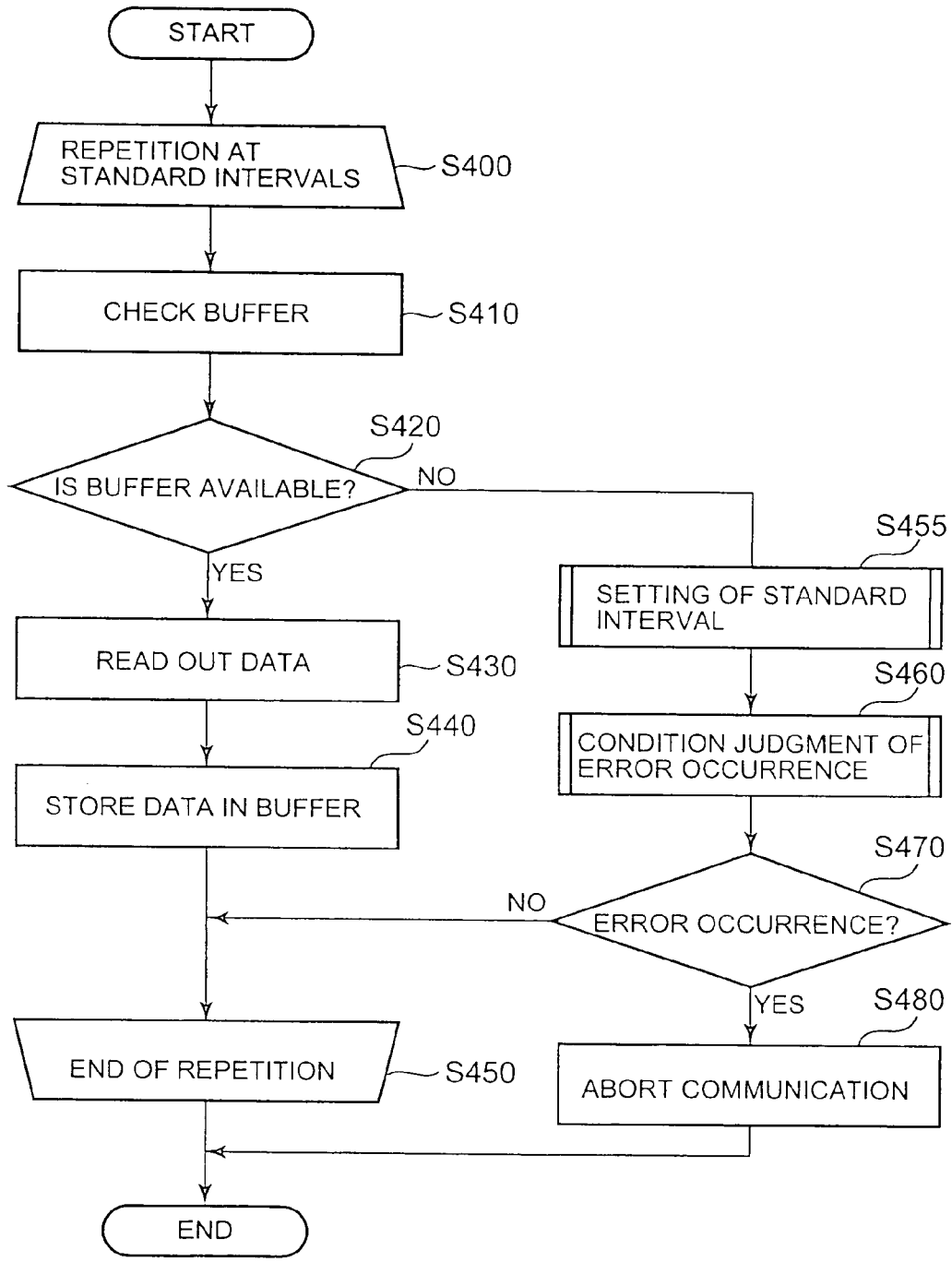
FIG. 7 is a flowchart of processing for the storage device of FIG. 2 to transmit data, in accordance with second embodiments of the present invention.

FIG. 7 is a flowchart of processing for the storage device of FIG. 2 to transmit data, in accordance with second embodiments of the present invention.

FIG. 7 shows a flowchart of processing for the storage device 20-1 to transmit data, in accordance with second embodiments of the present invention. Since the processing shown in FIG. 7 is almost the same as that shown in FIG. 4, description thereof will be omitted except different points. The standard interval setting unit 340 sets the standard time interval (S455) in response to not detecting the status where the buffer 210 is available (S420: NO). The error determining unit 320 then determines the condition for indicating that the error has occurred in the external communication line connected to the storage device 20-1 (S460).

Figure 8A:
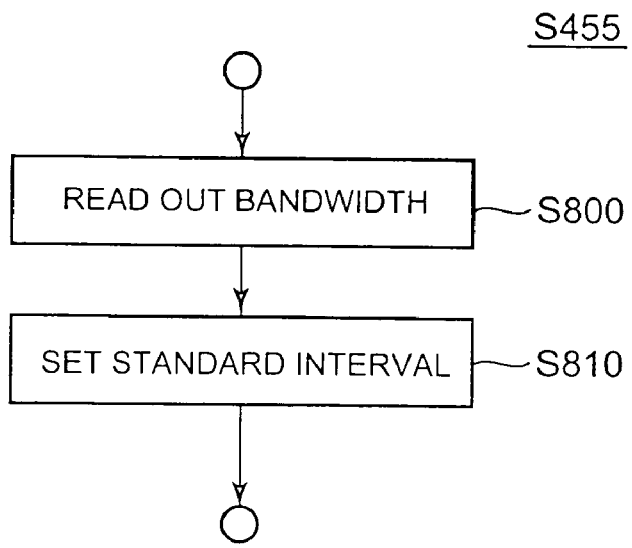
FIG. 8 is a flowchart of processes for error occurrence determination steps of F of FIG. 7.
Figure 8B:
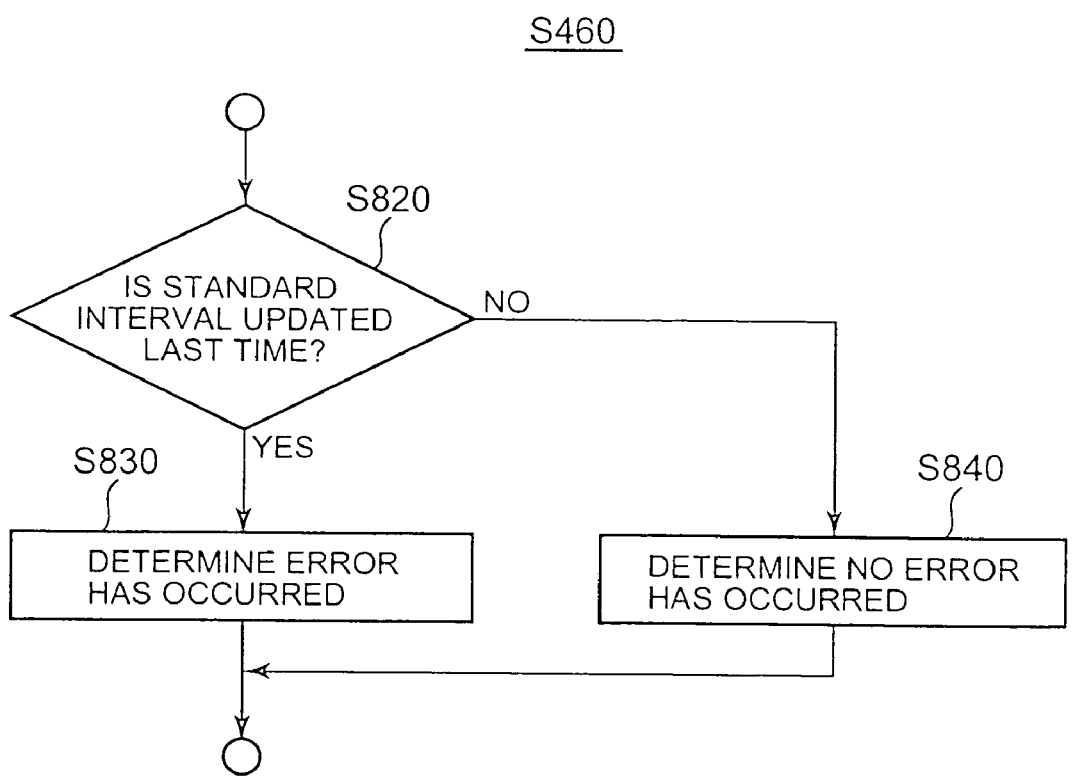

FIG. 8 is a flowchart of processes at S455 and S460 in FIG. 7. The process of S455 will be described. The bandwidth detector 330 reads the information indicating the bandwidth out of the switching device 30-1 on condition that the buffer detector 300 detects that the buffer 210 is not available (S800). The information indicating the bandwidth is stored in a predetermined memory and register in the switching device 30-1, and the bandwidth detector 330 may transmit a request for reading the information to the switching device 30-1. The standard interval setting unit 340 changes the standard time interval based on the information read by the bandwidth detector 330 (S810).

The process of S460 will be described. The error determining unit 320 determines whether the buffer 210 is not available and further the standard time interval is updated last time by the standard interval setting unit 340 (S820). If the standard time interval is updated by the standard interval setting unit 340 last time and if the step S460 is performed again thereafter, it suggests that the buffer detector 300 has detected that the buffer 210 is not available even after the setting of the updated standard time interval. The error determining unit 320 determines that the error has occurred in the external communication line connected to the storage device 20-1 (S830) on condition that the buffer detector 300 detects that the buffer 210 is not available even after the setting of the updated standard time interval (S820: YES).

If the buffer 210 is not available and the standard time interval is not updated yet by the standard interval setting unit 340 (S820: YES), the error determining unit 320 determines that the error has not occurred to thereby terminate the process shown in FIG. 8 (S840) in order to check the buffer 210 again using the updated standard time interval. As described above, the bandwidth may be detected only when the buffer 210 is not available, instead of periodically detecting the bandwidth. Hence, if the possibility that the bandwidth has been changed is low, detection processing of the bandwidth may be omitted, so that other processing can be efficiently performed.

As described hereinabove, the storage device 20-1 according to the embodiment adjusts the frequency of detecting the status where the buffer 210 provided in the storage device 20-1 is available according to the bandwidth of the communication line provided outside. Thereby, even where the bandwidth of the communication line is largely changed, it is possible to prevent an error in the communication line from being detected accidentally, thus allowing a proper communication to be continued.

While the present invention has been described in connection with the embodiments, it is to be understood that the technical scope of the present invention is not limited to the scope described in the aforementioned embodiments. It is obvious to those skilled in the art that various modifications or improvements may be made to the embodiments described above. For example, although the storage device 20-1 is connected to the main communication line 25 and the sub communication line 28 via the switching device 30-1 in the above embodiments, it may be directly connected to the main communication line 25 and the sub communication line 28 without passing through the switching device 30-1. It is apparent from the appended claims that the embodiments to which such modifications or improvements have been made should also be included in the technical scope of the present invention.

What is claimed is:

1. A control method for controlling a transmission of data in a storage device, comprising a recording unit for recording data, a buffer for temporarily storing the data read from said recording unit, and a transmission unit for transmitting the data read from said buffer to said storage device, comprising:

a step of detecting data transmitted over a main communication line from a first switching device to a second switching device connected to said buffer;

a step to detect whether or not any space is available in said buffer every time a predetermined reference period has passed;

a step to increase the predetermined reference period if an unavailable status in said buffer is detected less than a predetermined number of times;

a step to stop a transmission by said transmission unit due to a determination of a disturbance occurrence in the main communication line connected to said storage device, in response to no detection of available space in said buffer;

a step to route the data in the storage device to a sub communication line other than the main communication line if error is detected, wherein the main communication line is a different line than the sub communication line;

a step to detect a bandwidth of the main communication line connected to said storage device, on condition that a ratio of unused capacity of the output buffer to the maximum capacity of the output buffer, is less than a predetermined ratio;

a step to store the bandwidth in a predetermined storage area for the bandwidth;

a step to determine that a detected error has occurred in the main communication line if the bandwidth of the main communication line is larger than a predetermined threshold; and a step to set said reference period to be longer, compared to when said bandwidth is greater, when said bandwidth is smaller.

* * * * *